(12) United States Patent
Izawa et al.

(10) Patent No.: US 11,680,499 B2
(45) Date of Patent: Jun. 20, 2023

(54) SLIDING MEMBER

(71) Applicant: NISSAN MOTOR CO., LTD., Yokohama (JP)

(72) Inventors: Yoshinori Izawa, Kanagawa (JP); Yutaka Mabuchi, Kanagawa (JP); Akinobu Itou, Kanagawa (JP); Junichi Arai, Kanagawa (JP); Misao Mogami, Kanagawa (JP); Masanao Harada, Kanagawa (JP); Moriyuki Nogami, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 102 days.

(21) Appl. No.: 17/260,308

(22) PCT Filed: Jul. 19, 2018

(86) PCT No.: PCT/JP2018/027156
§ 371 (c)(1),
(2) Date: Jan. 14, 2021

(87) PCT Pub. No.: WO2020/017003
PCT Pub. Date: Jan. 23, 2020

(65) Prior Publication Data
US 2021/0293158 A1    Sep. 23, 2021

(51) Int. Cl.
*F01L 3/04* (2006.01)
*C23C 24/08* (2006.01)
*C23C 24/04* (2006.01)

(52) U.S. Cl.
CPC .............. *F01L 3/04* (2013.01); *C23C 24/087* (2013.01); *C23C 24/04* (2013.01); *F01L 2301/00* (2020.05)

(58) Field of Classification Search
None
See application file for complete search history.

(56) References Cited

U.S. PATENT DOCUMENTS

| 5,993,978 A | 11/1999 | Kim et al. |
| 2018/0223902 A1 | 8/2018 | Izawa |
| 2018/0283234 A1 | 10/2018 | Hashimoto |

FOREIGN PATENT DOCUMENTS

| CN | 107849699 A | 3/2018 |
| EP | 3 333 283 A1 | 6/2018 |

(Continued)

*Primary Examiner* — Michael P. Rodriguez
(74) *Attorney, Agent, or Firm* — Foley & Lardner LLP

(57) ABSTRACT

A sliding member of the present invention includes a coating on a base material. The coating contains hard metal particles and corrosion-resistant metal particles that have hardness lower than that of the hard metal particles. The hard metal particles contain particles that have at least Vickers hardness of 600 Hv or higher. The corrosion-resistant metal particles are made of at least one kind of metal selected from the group consisting of copper (Cu), cobalt (Co), chromium (Cr), and nickel (Ni), or are made of an alloy containing said metal. The coating has a cross section in which the hard metal particles are dispersed in an island manner in a particle aggregate of the corrosion-resistant metal particles and in which an area ratio of the corrosion-resistant metal particles is 30% or larger. Thus, corrosion of the hard metal particles in the coating is prevented, whereby the sliding member maintains wear resistance for a long time.

12 Claims, 3 Drawing Sheets

(56) References Cited

FOREIGN PATENT DOCUMENTS

| | | |
|---|---|---|
| EP | 3333283 A1 * 6/2018 | ............... C22C 9/00 |
| EP | 3 578 282 A1 12/2019 | |
| EP | 3 578 685 A1 12/2019 | |
| EP | 3 578 686 A1 12/2019 | |
| EP | 3 578 688 A1 12/2019 | |
| JP | 6-179937 A 6/1994 | |
| WO | WO-2017/057464 A1 4/2017 | |

* cited by examiner

SLIDING MEMBER

TECHNICAL FIELD

The present invention relates to a sliding member, and more specifically relates to a sliding member including hard metal particles and having improved wear resistance.

BACKGROUND ART

A sliding member that is used in an internal combustion engine, such as of an automobile, is required to have superior wear resistance and low wear characteristics against a mating member.

JPH6-179937A of patent document 1 discloses a sintered alloy for a valve seat. In this sintered alloy for a valve seat, hard alloy particles, solid lubricant, and ceramic particles are dispersed in a martensitic structure of an iron-based alloy, whereby wear resistance is improved, and wear characteristics against a mating member is lowered.

CITATION LIST

Patent Document

Patent Document 1: JPH6-179937A

SUMMARY OF INVENTION

Technical Problem

However, in general, a sintered alloy contains a lot of voids between alloy particles of materials of the sintered alloy, and in a case in which corrosion occurs at a void in a sliding member, the corrosion progresses to corrode the vicinity of a grain boundary at which particles are bonded to each other, because a surface is not newly generated in the void, unlike a sliding surface. This causes decrease in bond strength between the particles, resulting in reduction in wear resistance.

In recent years, a ratio of intermittent driving operation is increased in response to the demand for reducing fuel consumption, and therefore, condensed water, which is generated by a condensation of water contained in, e.g., exhaust gas, tends to stay in the voids. This condensed water reacts with nitrogen oxides or sulfur oxides contained in exhaust gas, to generate acids in the voids.

Furthermore, the voids, which are formed between alloy particles of a sintered alloy, are small. Thus, an oxygen concentration cell is formed in a coating, and corrosion starts from the void and progresses in the coating to reduce wear resistance.

In consideration of them, in a sliding member that is used in an internal combustion engine, it is necessary to improve corrosion resistance, in addition to wear resistance and wear characteristics against a mating member.

The present invention has been made in view of these problems in the conventional art, and an object thereof is to provide a sliding member having high corrosion resistance and having wear resistance that is prevented from being reduced with time.

Solution to Problem

The inventors of the present invention have made an intensive research to achieve the above object and have found the following findings. That is, covering most of hard metal particles with corrosion-resistant metal particles enables achieving the above object. Thus, the present invention has been completed.

That is, a sliding member of the present invention includes a coating on a base material.

Furthermore, the coating contains hard metal particles and corrosion-resistant metal particles that have hardness lower than that of the hard metal particles.

The hard metal particles contain particles that have at least Vickers hardness of 600 Hv or higher.

The corrosion-resistant metal particles are made of at least one kind of metal selected from the group consisting of copper (Cu), cobalt (Co), chromium (Cr), and nickel (Ni), or are made of an alloy containing said metal.

The coating has a cross section in which the hard metal particles are dispersed in an island manner in a particle aggregate of the corrosion-resistant metal particles and in which an area ratio of the corrosion-resistant metal particles is 30% or larger.

Advantageous Effects of Invention

In the present invention, the hard metal particles are dispersed in an island manner in a particle aggregate of the corrosion-resistant metal particles, whereby corrosion of the hard metal particles in the coating is prevented. Thus, the present invention provides a sliding member that maintains wear resistance for a long time.

DESCRIPTION OF EMBODIMENTS

<Sliding Member>

A sliding member of the present invention will be described in detail.

Figure 1:
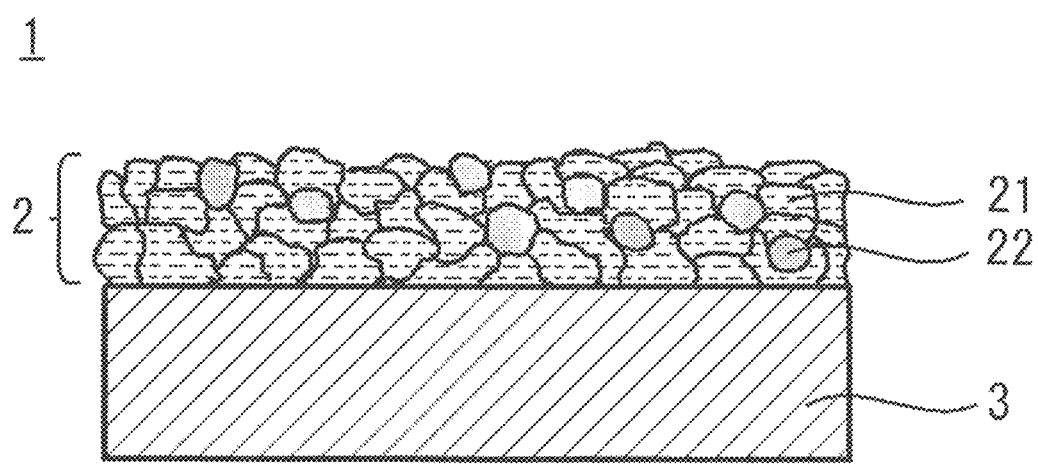
FIG. 1 is a schematic sectional view illustrating an example of a cross section of a sliding member of the present invention.

As illustrated in FIG. 1, the sliding member 1 includes a coating 2 on a base material 3, and the coating 2 contains hard metal particles 22 and corrosion-resistant metal particles 21 that have hardness lower than that of the hard metal particles 22. In a cross section of the coating 2, the hard metal particles 22 are dispersed in an island manner in a particle aggregate of the corrosion-resistant metal particles 21.

The particle aggregate in the present invention is an aggregate of particles, in which the particles form interfaces without forming a uniform structure. The surfaces of the particles forming the coating are locally melted and solidified, and the particles of the entire coating are bonded and aggregated to each other. The particle aggregate of the present invention is not an aggregate, in which particles are completely melted or dissolved and solidified to form a uniform structure.

The corrosion-resistant metal particles are made of a metal material that is superior to iron in corrosion resistance. The corrosion-resistant metal particles are made of at least one kind of metal selected from the group consisting of copper (Cu), cobalt (Co), chromium (Cr), and nickel (Ni), or are made of an alloy containing said metal.

Although chromium is a metal having a greater tendency to ionize than iron, chromium forms an oxide film of $Cr_2O_3$ in a passive state, on a surface, whereby not only alloy containing chromium, such as stainless steel, but also even single chromium has superior corrosion resistance.

For example, an alloy containing 50 mass % or greater of copper is preferably used as the above-described alloy because of having high natural potential and superior corrosion resistance. Examples of this alloy include Cu—Ni—Si alloys, Cu—Co—Si alloys, Cu—Ag alloys, Cu—Al alloys, Cu—Ni alloys, and Cu—Ti alloys.

In particular, the alloys containing Si, such as Cu—Ni—Si alloys and Cu—Co—Si alloys, are preferably used, because they form an oxide film of $SiO_2$ due to diffusion of Si to a surface, and the oxide film acts as a passive film to improve corrosion resistance.

The coating has a cross section in which the hard metal particles are dispersed in an island manner in a particle aggregate of the corrosion-resistant metal particles to form a sea-island structure. Most of the hard metal particles are covered with the corrosion-resistant metal particles and are not exposed to inner surfaces of voids in the coating, whereby corrosion occurring in the coating can be prevented.

A soft metal material generally has a low melting point and is easily melted to be strongly bonded. The corrosion-resistant metal particles have hardness lower than that of the hard metal particles, which will be described later, and they have Vickers hardness of lower than 600 Hv. Thus, the corrosion-resistant metal particles are strongly bonded to each other in forming a particle aggregate, resulting in improvement in strength and wear resistance of the coating.

The lower limit of Vickers hardness of the corrosion-resistant metal particles is not specifically limited, but corrosion-resistant metal particles having Vickers hardness of 80 Hv or higher improve wear resistance.

In the coating, an area ratio in cross section of the corrosion-resistant metal particles is 30% or larger, more preferably 50% or larger, and further preferably 80% or larger. When the area ratio of the corrosion-resistant metal particles is large, the corrosion-resistant metal particles cover the hard metal particles to improve corrosion resistance, and the corrosion-resistant metal particles are strongly bonded to each other to improve coating strength.

Any particles that have hardness higher than that of the corrosion-resistant metal particles and that contain particles having Vickers hardness of 600 Hv or higher, can be used as the hard metal particles. However, in consideration that the hard metal particles come into contact with the corrosion-resistant metal particles in the coating and form a local cell with the corrosion-resistant metal particles, the hard metal particles preferably contain a metal material of the same type as the metal material of the corrosion-resistant metal particles.

Specifically, at least one kind of metal selected from the group consisting of cobalt (Co), chromium (Cr), and nickel (Ni), or an alloy containing said metal, can be used.

Examples of this alloy include hard cobalt-based alloys, such as TRIBALOY (registered trademark) T-400, and Stellite (registered trademark) 6, and hard nickel-based alloys, such as TRIBALOY (registered trademark) T-700, and Ni700 (registered trademark) (Ni-32Mo-16Cr-3.1Si).

More preferably, the hard metal particles have Vickers hardness of 700 Hv or higher and 1500 Hv or lower. When the hard metal particles have Vickers hardness in this range, wear resistance and wear characteristics against a mating member are both obtained.

In a cross section of the coating, an area ratio of the hard metal particles is preferably 5% or larger and 50% or smaller, more preferably 5% or larger and 30% or smaller, and further preferably 10% or larger and 15% or smaller.

When the area ratio of the hard metal particles is in this range, wear resistance is improved, as well as coating strength is improved, in conjunction with the corrosion-resistant metal particles.

Figure 2:
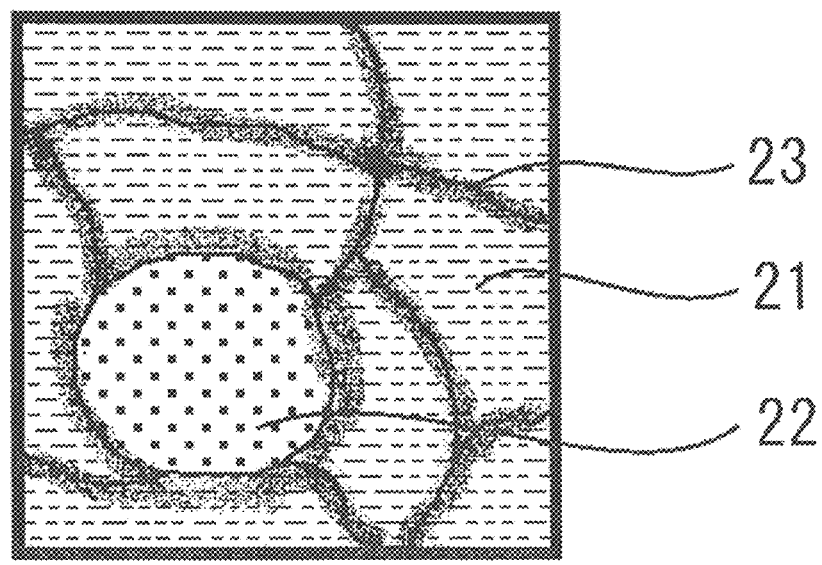
FIG. 2 is a schematic enlarged sectional view illustrating an example of a coating structure.

The coating preferably has amorphous substance 23 at least at a part of an interface between the corrosion-resistant metal particles 21 and an interface between the corrosion-resistant metal particle 21 and the hard metal particle 22, as illustrated in FIG. 2.

The amorphous substance has a random structure having no regular atomic arrangement, such as of a crystal. The amorphous substance is uniform and isotropic without containing inclusions and without causing segregation, and it has no grain boundary and no lattice defect, e.g., dislocation, which will be a starting point of corrosion. Thus, the amorphous substance is generally superior in corrosion resistance.

The particle itself has improved corrosion resistance by having an amorphous substance at the interface between the particles that form the coating, that is, on the surface of the particle. This suppresses occurrence of corrosion from the inside of the coating, although a void exists between the particles.

The amorphous substance can be formed in deposition by a cold spray method, which will be described later.

The average grain size of crystal grains in the particles is preferably 10 μm or smaller, and preferably 5 μm or smaller. When crystal grains in the particles are fine, coating strength is improved.

The amorphous substance at an interface of the particle and the crystal grains in the particles can be recognized by analyzing a crystal orientation from a projected pattern. The projected pattern is obtained such that a diffraction pattern is projected on a detector surface by electron backscatter diffraction (EBSD) performed in a scanning electron microscope (SEM).

In a cross section of the coating, a void content is preferably 10 area % or smaller, and preferably 5 area % or smaller. When the coating is dense with a small amount of voids, condensed water hardly stays in the coating and hardly causes crevice corrosion, whereby reduction in wear resistance can be suppressed for a long time.

The coating preferably has a small amount of voids, however, when voids are inevitably generated, such as in a case in which the coating is a sintered body, the void is preferably an independent void. An independent void prevents condensed water from entering the void in the coating and also prevents an oxygen concentration cell from forming in the coating, whereby occurrence of crevice corrosion is suppressed.

The area ratio of the corrosion-resistant metal particles, the area ratio of the hard metal particles, and the void content, in a cross section of the coating, can be calculated by analyzing an image, which is obtained by binarizing a scanning electron microscope image (SEM image) in image processing.

The average grain size of the corrosion-resistant metal particles and the hard metal particles in a cross section of the coating is preferably from 5 to 100 μm, and more preferably from 5 to 40 μm. The average grain size is an equivalent circular diameter and is a diameter of a circle having the same area as a projected area of a particle image.

Particles having a small average grain size can form a dense coating, however, particles having an excessively small average particle size hardly plastically deform due to having small kinetic energy in performing a cold spray method, which will be described later. As a result, adhesion between the particles may be reduced, and coating strength may be lowered.

The natural potential of the coating is preferably −600 mV or higher, and more preferably 0 mV or higher. The coating having a high natural potential inhibits the progress of corrosion and suppresses reduction in wear resistance for a long time.

Although depending on temperature and sliding environment at a part at which the sliding member is used, the thickness of the coating is, for example, preferably from 0.05 to 5.0 mm, and more preferably from 0.1 to 2.0 mm.

When the thickness is less than 0.05 mm, the strength of the coating itself may be insufficient, and plastic deformation may occur in case the strength of the base material is low. On the other hand, when the thickness exceeds 10 mm, the coating may easily come off in accordance with a relationship between interface adhesion strength and residual stress that occurs in deposition.

The relative difference in natural potential between the coating and the base material is preferably 1100 mV or smaller. When the difference in natural potential between the coating and the base material is small, contact corrosion between dissimilar metals can be prevented.

The base material is not specifically limited, and a metal that is conventionally used for a sliding member of an internal combustion engine can be used, but an aluminum alloy can be preferably used because of its high thermal conductivity.

Examples of the aluminum alloy include AC2A, AC8A, and ADC12, which are defined in Japanese Industrial Standards.

The sliding member is superior in corrosion resistance and wear resistance and can be suitably used for, for example, a piston, a piston ring, a piston pin, a cylinder, a crankshaft, a camshaft, and a valve lifter.

<Manufacturing Method of Sliding Member>

The sliding member can be manufactured by, e.g. a method of cold spraying mixed particles of the corrosion-resistant metal particles and the hard metal particles onto a surface of the base material to form a coating, or a method of pressing fit a sintered body, which is obtained by sintering a green body of the mixed particles, into the base material.

Cold spray is a method for forming a coating by making metal particles of materials collide with a base material together with inert gas, in a supersonic flow, in a condition in which the metal particles are not melted and not gasified but in a solid phase state. Cold spray can minimize changes in characteristics of the metal particles due to heat and oxidation in the coating, unlike a method for forming a coating by melting metal particles, such as a thermal spraying method.

With the use of cold spray, upon collision of metal particles in the solid phase state with a base material, the metal particles themselves plastically deform. At the same time, the surfaces of the metal particles are locally melted by thermal energy that is converted from a part of kinetic energy, and the melted surfaces are solidified, whereby the metal particles are bonded to each other to form a coating.

At this time, the temperatures of the base material and the metal particles are at the melting point of the metal particles or lower. Thus, the locally melted surfaces of the metal particles are rapidly cooled to form amorphous substance at interfaces between the particles, and the metal particles are plastically deformed and crystal grains in the metal particles become fine.

In the present invention, the mixed particles of the corrosion-resistant metal particles and the hard metal particles, are sprayed. This makes the relatively soft corrosion-resistant metal particles be plastically deformed to accumulate without spaces and be bonded to each other, thereby forming a particle aggregate of the corrosion-resistant metal particles having amorphous substance at interfaces between the particles. The hard metal particles are embedded into the particle aggregate, resulting in formation of a coating containing the hard metal particles that are dispersed in an island manner in the particle aggregate.

The spray velocity of the mixed particles is preferably from 300 to 1200 m/s, and preferably from 500 to 1000 m/s.

The pressure of working gas for spraying the mixed particles is preferably from 2 to 5 MPa, and more preferably from 3.5 to 5 MPa. When the pressure of the working gas is lower than 2 MPa, particle velocity may not be obtained, and the void content may increase.

Although depending on the mixed particles, the temperature of the working gas is preferably from 400 to 800° C., and more preferably from 600 to 800° C.

When the temperature of the working gas is lower than 400° C., the corrosion-resistant metal particles hardly plastically deform, whereby the void content may increase, and corrosion resistance may be reduced. On the other hand, when the temperature of the working gas exceeds 800° C., the corrosion-resistant metal particles that collide with the base material are so softened as to generate only a small amount of residual stress, which can cause easily coming off of the coating.

Examples of the working gas include nitrogen gas and helium gas, and they may be used alone or in combination.

The sintering is a method of baking a green body of metal particles at a temperature lower than the melting temperature of the metal particles. The sintering bonds the particles without melting them and can thereby reduce changes in characteristics of the metal particles due to heat. In view of this, metal particles are heavily worked to make the crystal grains in the metal particles fine in advance. This enables making the crystal grains in the metal particles fine and forming a high strength coating.

The green body of the metal particles can be molded by a compression molding method or a generally called metal powder injection molding method. The compression molding method involves placing the metal particles into a mold and compacting them. The metal powder injection molding method involves molding a pellet of the metal particles that are kneaded with binder, in a manner similar to that of plastic injection molding, and removing the binder by, e.g. heating.

The temperature of sintering the green body is preferably from 900 to 1100° C., although depending on the kind of the mixed particles.

EXAMPLES

The present invention will be detailed with reference to Examples hereinafter, but the present invention is not limited to Examples described below.

Example 1

In the state of being already worked into a seat of an engine valve of a cylinder head, an aluminum base material (Japanese Industrial Standards H 4040 A5056) was grooved in preprocessing, on the condition that a target coating thickness was 0.2 mm. Thus, the aluminum base material was prepared.

After a pellet of raw material for MIM containing the following mixed particles and binder was injection molded, the injection molded body was degreased by heating, and the degreased body having a diameter of 40 mm and a length of 14 mm was heated at 1000° C. for 1 hour, whereby a sintered body was obtained.

Corrosion-resistant metal particles: $CaF_2$ added Cu-2.9Ni-0.7Si alloy particles (average grain size of 10 μm) that were heavily worked Hard metal particles: Co alloy particles (manufactured by Kennametal Inc., Tribaloy T-400, average grain size of 45 μm) that were heavily worked Corrosion-resistant metal particles/Hard metal particles (volume ratio): 89/10

The sintered body was cut into a valve seat shape, and this was press fitted into the groove of the aluminum base material. This aluminum base material was finished into the shape of the seat of the engine valve by machining, whereby a sliding member having a 0.5 mm-thick coating was obtained.

Example 2

The following mixed particles were cold sprayed under the following conditions while the aluminum base material was rotated, whereby a 1 mm-thick coating was formed.

Corrosion-resistant metal particles: Cu-2.9Ni-0.7Si alloy particles (average grain size of 30 μm)

Hard metal particles: Co alloy particles (manufactured by Kennametal Inc., Tribaloy T-400, average grain size of 45 μm)

Corrosion-resistant metal particles/Hard metal particles (volume ratio): 89/10

High-pressure cold spray equipment: manufactured by CGT GmbH, Kinetiks 4000

Working gas: nitrogen gas
Gas temperature: 600° C.
Gas pressure: 4 MPa
Particle velocity: from 680 to 720 m/s The aluminum base material that was formed with the coating was finished into the shape of the seat of the engine valve of the cylinder head by machining, whereby a sliding member having a 0.5 mm-thick coating was obtained.

Example 3

A sliding member was obtained in the same manner as in Example 2, except that the following mixed particles were cold sprayed under the following conditions while the aluminum base material was rotated.

Corrosion-resistant metal particles: Cu-2.9Ni-0.7Si alloy particles (average grain size of 30 μm)

Hard metal particles: Fe alloy particles (SKH51, average grain size of 45 μm)

Corrosion-resistant metal particles/Hard metal particles (volume ratio): 80/18

High-pressure cold spray equipment: manufactured by CGT GmbH, Kinetiks 4000

Working gas: nitrogen gas
Gas temperature: 600° C.
Gas pressure: 3.5 MPa
Particle velocity: from 650 to 690 m/s

Example 4

A sliding member was obtained in the same manner as in Example 2, except that the following mixed particles were cold sprayed under the following conditions while the aluminum base material was rotated.

Corrosion-resistant metal particles: SUS440C particles (average grain size of 30 μm)

Hard metal particles: Co alloy particles (manufactured by Kennametal Inc., Tribaloy T-400, average grain size of 45 μm)

Corrosion-resistant metal particles/Hard metal particles (volume ratio): 81/18

High-pressure cold spray equipment: manufactured by CGT GmbH, Kinetiks 4000

Working gas: nitrogen gas
Gas temperature: 750° C.
Gas pressure: 4 MPa
Particle velocity: from 740 to 780 m/s

Example 5

The following mixed particles were placed into a mold of 40 mm diameter and were molded at 1000 kN, and the green compact having a diameter of 40 mm and a length of 14 mm was heated at 1000° C. for 1 hour, whereby a sintered body was obtained.

Corrosion-resistant metal particles: $CaF_2$ added Cu-2.9Ni-0.7Si alloy particles (average grain size of 80 μm)

Hard metal particles: Ni alloy particles (manufactured by Kennametal Inc., Tribaloy T-700, average grain size of 45 μm)

Corrosion-resistant metal particles/lard metal particles (volume ratio): 82/14

The sintered body was cut into the valve seat shape, and this was press fitted into the groove of the aluminum base material. This aluminum base material was finished into the shape of the seat of the engine valve by machining, whereby a sliding member having a 0.5 mm-thick coating was obtained.

Example 6

A sliding member was obtained in the same manner as in Example 5, except for using the following mixed particles.

Corrosion-resistant metal particles: $CaF_2$ added Cu-2.9Ni-0.7Si alloy particles (average grain size of 80 μm)

Hard metal particles: Co alloy particles (manufactured by Kennametal Inc., Tribaloy T-400, average grain size of 45 μm)

Corrosion-resistant metal particles/Hard metal particles (volume ratio): 57/42

Example 7

A sliding member was obtained in the same manner as in Example 5, except for using the following mixed particles.

Corrosion-resistant metal particles: $CaF_2$ added Cu-2.9Ni-0.7Si alloy particles (average grain size of 80 μm)

Hard metal particles: Co alloy particles (manufactured by Kennametal Inc., Tribaloy T-400, average grain size of 45 μm, Vickers hardness of 905 Hv)

Hard metal particles: Fe alloy particles (SKH51, average grain size of 45 μm)

Corrosion-resistant metal particles/Co alloy particles/Fe alloy particles (volume ratio): 46/17/28

Example 8

A sliding member was obtained in the same manner as in Example 5, except for using the following mixed particles.

Corrosion-resistant metal particles: $CaF_2$ added Cu-2.9Ni-0.7Si alloy particles (average grain size of 80 μm)

Hard metal particles: Fe alloy particles (SKH51, average grain size of 45 μm)

Corrosion-resistant metal particles/Hard metal particles (volume ratio): 39/51

Comparative Example 1

Zinc stearate in an amount of 1 mass % was added to and mixed with the following mixed particles, and the mixture was placed into a mold of 40 mm diameter and was molded at 1000 kN, whereby a green compact having a diameter of 40 mm and a length of 14 mm was obtained.

Corrosion-resistant metal particles: Cu alloy particles (average grain size of 80 μm)

Hard metal particles: Co alloy particles (manufactured by Kennametal Inc., Tribaloy T-400, average grain size of 45 μm)

Hard metal particles: Fe and graphite dispersed Fe alloy particles (average grain size of 45 μm)

Corrosion-resistant metal particles/Co alloy particles/Fe alloy particles (volume ratio): 15/36/38

Infiltrating copper was placed on a top of the green compact, and they were heated at 1000° C. for 1 hour in an atmosphere of decomposed ammonia gas. Except for using this sintered body, a sliding member was obtained in the same manner as in Example 5.

Comparative Example 2

A sliding member was obtained in the same manner as in Example 5, except for using the following mixed particles.

Corrosion-resistant metal particles: $CaF_2$ added Cu-2.9Ni-0.7Si alloy particles (average grain size of 80 μm)

Hard metal particles: Fe and graphite dispersed Fe alloy particles (average grain size of 45 μm) Corrosion-resistant metal particles/Hard metal particles (volume ratio): 48/42

Comparative Example 3

A sliding member was obtained in the same manner as in Example 5, except for using the following mixed particles.

Corrosion-resistant metal particles: Cu alloy particles (average grain size of 80 μm)

Hard metal particles: Co alloy particles (manufactured by Kennametal Inc., Tribaloy T-400, average grain size of 45 μm)

Hard metal particles: Fe and graphite dispersed Fe alloy particles (average grain size of 45 μm)

Corrosion-resistant metal particles/Co alloy particles/Fe alloy particles (volume ratio): 10/27/53

Comparative Example 4

A sliding member was obtained in the same manner as in Example 5, except for using the following mixed particles.

Hard metal particles: Co alloy particles (manufactured by Kennametal Inc., Tribaloy T-400, average grain size of 45 μm)

Hard metal particles: Fe and graphite dispersed Fe alloy particles (average grain size of 45 μm)

Co alloy particles/Fe alloy particles (volume ratio): 36/55

Comparative Example 5

A sliding member was obtained in the same manner as in Example 5, except for using the following mixed particles.

Hard metal particles: Co alloy particles (manufactured by Kennametal Inc., Tribaloy T-400, average grain size of 45 μm)

Hard metal particles: Fe and graphite dispersed Fe alloy particles (average grain size of 45 μm)

Co alloy particles/Fe alloy particles (volume ratio): 22/68

<Evaluation>

The sliding members of Examples 1 to 8 and Comparative Examples 1 to 5 were evaluated by the following methods.

The results of the evaluation are shown in Tables 1 and 2.

(Observation of Coating Structure)

Figure 3:
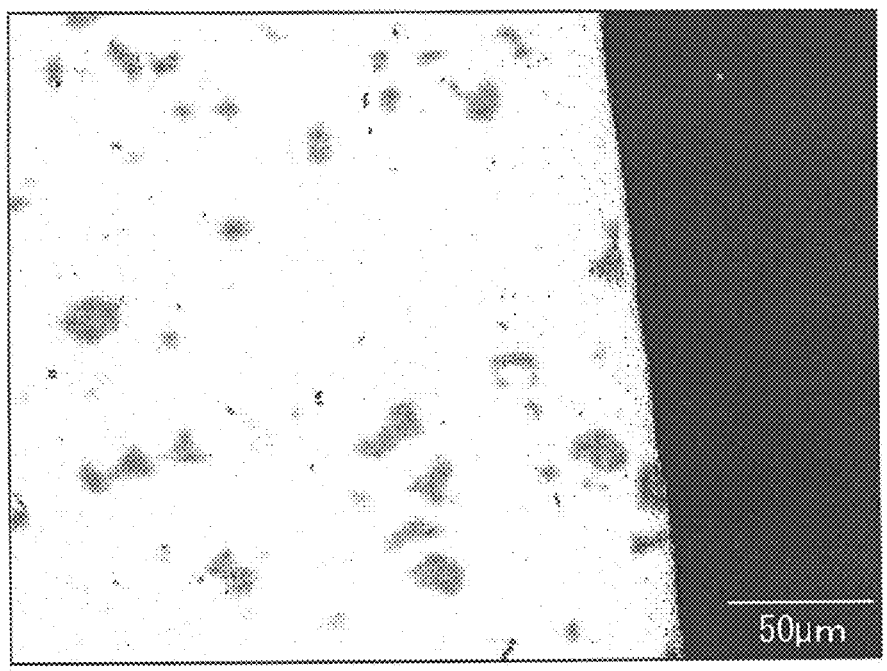
FIG. 3 is a SEM image of a cross-section of a sliding member of Example 2.

Electron backscatter diffraction (EBSD) was performed by using a scanning electron microscope (SEM) to observe existence of a sea-island structure, existence of amorphous substance, crystal grain size in a particle, void content, and corroded parts, in a coating structure. A SEM image of a cross section of the sliding member of Example 2 is illustrated in FIG. 3.

(Hardness)

Vickers hardness of the corrosion-resistant metal particle part and the hard metal particle part in the coating was measured and calculated in accordance with "Vickers hardness test (JIS Z 2244)".

(Corrosion Resistance)

Immersion was performed with nitric acid of 0.5 mass % (liquid temperature of 25° C. for 20 hours. After corrosion product was removed, weight was measured, and a mass reduction rate was calculated from masses before and after the corrosion resistance test.

(Measurement of Natural Potential)

A coating was deposited in a thickness of 8 mm on a surface of an aluminum alloy base material, and a sample piece of 15 mm sides and 5 mm thickness was cut out from the coating part. One side surface of the sample piece was polished with waterproof paper of No. 1000, and the sample piece was shaped to have 10 mm sides, whereby a sample electrode was prepared. With the use of platinum for a counter electrode, natural potential was measured in nitric acid of 0.5 wt % (25° C.).

(Wear Resistance)

A wear amount of the sliding member after the corrosion resistance test, was measured under the following conditions by using a valve seat abrasion testing machine, which is manufactured by Takachiho Seiki Co., Ltd.

Specifically, the shapes of the seat of the engine valve of the cylinder head before and after the test, were obtained by using a shape measurement apparatus, and wear amounts of four positions were measured. The measured values were averaged, and the average was used as a wear amount.

Mating valve member: SUH35
Test temperature: 300° C.
Vertical speed: 3000 times/min
Number of revolutions of valve: 5 rpm
Number of seating operations: 540000 times

TABLE 1

| | | Example 1 | Example 2 | Example 3 | Example 4 |
|---|---|---|---|---|---|
| Corrosion-Resistant Metal Material | Material | Cu—Ni—Si Alloy (CaF$_2$ added) | Cu—Ni—Si Alloy | Cu—Ni—Si Alloy | SUS440C |
| | Hardness | 110 Hv0.1 | 205 Hv0.1 | 202 Hv0.1 | 530 Hv0.025 |
| | Area Ratio | 89% | 89% | 80% | 81% |
| Hard Metal Material | Material | Co Alloy (Tribaloy T-400) | Co Alloy (Tribaloy T-400) | Fe Alloy (SKH51) | Co Alloy (Tribaloy T-400) |
| | Hardness | 955 Hv0.1 | 912 Hv0.1 | 610 Hv0.025 | 890 Hv0.1 |
| | Area Ratio | 10% | 10% | 18% | 18% |
| Hard Metal Material | Material | — | — | — | — |
| | Hardness | — | — | — | — |
| | Area Ratio | — | — | — | — |
| Coating Structure | Coating Structure | Hard metal particles were dispersed in island manner in particle aggregate of corrosion resistant metal material | Hard metal particles were dispersed in island manner in particle aggregate of corrosion resistant metal material | Hard metal particles were dispersed in island manner in particle aggregate of corrosion resistant metal material | Hard metal particles were dispersed in island manner in particle aggregate of corrosion resistant metal material |
| | Void Content | 1% | 1% | 2% | 1% |
| | Void Shape | Spherical Independent Voids | Indefinite Shape along Particle Boundary | Indefinite Shape along Particle Boundary | Indefinite Shape along Particle Boundary |
| | Microscopic Structure in Particles | Crystal Grains with approximately 5 μm, No amorphous layer | Amorphous layer in the vicinity of particle surfaces, Crystal Grains with approximately 5 μm at centers of particles | Amorphous layer in the vicinity of particle surfaces, Crystal Grains with approximately 5 μm at centers of particles | Amorphous layer in the vicinity of particle surfaces, Crystal Grains with approximately 5 μm at centers of particles |
| | Area Ratio of Crystal Grains with Grain Size of 1 μm or Less in Corrosion-Resistant Metal Particles | 21% | 21% | 18% | 10% |
| Corrosion Resistance | Natural Potential of Coating | 291 mV | 284 mV | | |
| | Relative Difference in Natural Potential Between Coating and Base Material | 1024 mV | 1017 mV | | |
| | Mass Reduction Rate | 0.1% | 0.1% | 1% | 1% |
| | Main Corrosion State | Corrosion of Co Alloy Part | Corrosion of Co Alloy Part | Corrosion of SUS316L and Co Alloy Part | Corrosion of SUS316L and Co Alloy Part |
| Wear Resistance | Wear Amount | 14 μm | 14 μm | 17 μm | 20 μm |
| | Manufacturing Method | MIM (Metal Powder Injection Molding) | Cold Spray | Cold Spray | Cold Spray |

| | | Example 5 | Example 6 | Example 7 | Example 8 |
|---|---|---|---|---|---|
| Corrosion-Resistant Metal Material | Material | Cu—Ni—Si Alloy (CaF$_2$ added) | Cu—Ni—Si Alloy (CaF$_2$ added) | Cu—Ni—Si Alloy (CaF$_2$ added) | Cu—Ni—Si Alloy (CaF$_2$ added) |
| | Hardness | 105 Hv | 98 Hv0.1 | 103 Hv0.1 | 108 Hv0.1 |
| | Area Ratio | 82% | 52% | 46% | 39% |
| Hard Metal Material | Material | Ni Alloy (Tribaloy T-700) | Co Alloy (Tribaloy T-400) | Co Alloy (Tribaloy T-400) | Fe Alloy (SKH51) |
| | Hardness | 970 Hv0.1 | 905 Hv0.1 | 1013 Hv0.1 | 637 Hv0.025 |
| | Area Ratio | 14% | 42% | 17% | 51% |
| Hard Metal Material | Material | — | — | Fe Alloy (SKH51) | — |
| | Hardness | — | — | 701 Hv0.025 | — |
| | Area Ratio | — | — | 28% | — |
| Coating Structure | Coating Structure | Hard metal particles were dispersed in island manner in particle aggregate of corrosion resistant metal material | Hard metal particles were dispersed in island manner in particle aggregate of corrosion resistant metal material | Hard metal particles were dispersed in island manner in particle aggregate of corrosion resistant metal material | Hard metal particles were dispersed in island manner in particle aggregate of corrosion resistant metal material |

TABLE 1-continued

|  |  |  |  |  |  |
|---|---|---|---|---|---|
|  | Void Content | 4% | 6% | 9% | 10% |
|  | Void Shape | Indefinite Shape along Particle Boundary | Indefinite Shape along Particle Boundary | Indefinite Shape along Particle Boundary | Indefinite Shape along Particle Boundary |
|  | Microscopic Structure in Particles | Crystal Grains with approximately 20 μm, No amorphous layer | Crystal Grains with approximately 20 μm, No amorphous layer | Crystal Grains with approximately 20 μm, No amorphous layer | Crystal Grains with approximately 20 μm, No amorphous layer |
|  | Area Ratio of crystal Grains with Grain Size of 1 μm or Less in Corrosion-Resistant Metal Particles | 0% | 0% | 0% | 0% |
| Corrosion Resistance | Natural Potential of Coating |  | −401 mV | −551 mV | −598 mV |
|  | Relative Difference in Natural Potential Between Coating and Base Material |  | 332 mV | 182 mV | 135 mV |
|  | Mass Reduction Rate | 1.8% | 2% | 2.5% | 4.0% |
|  | Main Corrosion State | Corrosion of Ni Alloy Part Crevice Corrosion of Void Part | Corrosion of Co Alloy Part Crevice Corrosion of Void Part | Corrosion of Fe Alloy Part Crevice Corrosion of Void Part | Corrosion of Fe Alloy Part Crevice Corrosion of Void Part |
| Wear Resistance | Wear Amount | 18 μm | 20 μm | 21 μm | 22 μm |
|  | Manufacturing Method | Sintering | Sintering | Sintering | Sintering |

TABLE 2

|  |  | Comparative Example 1 | Comparative Example 2 |
|---|---|---|---|
| Corrosion-Resistant Metal Material | Material | Cu Alloy | Cu—Ni—Si Alloy (CaF$_2$ added) |
|  | Hardness | 89 Hv0.025 | 108 Hv0.1 |
|  | Area Ratio | 15% | 48% |
| Hard Metal Material | Material | Co Alloy (Tribaloy T-400) | Fe Alloy (Fe Powder + Graphite Dispersed) |
|  | Hardness | 1050 Hv0.1 | 370 Hv0.1 |
|  | Area Ratio | 36% | 42% |
| Hard Metal Material | Material | Fe and Fe Alloy (Fe Powder + Graphite Dispersed) | — |
|  | Hardness | 320 Hv0.1 | — |
|  | Area Ratio | 38% | — |
| Coating Structure | Coating Structure | Hard metal particles were dispersed in island manner in particle aggregate of corrosion resistant metal material | Hard metal particles were dispersed in island manner in particle aggregate of corrosion resistant metal material |
|  | Void Content | 11% | 10% |
|  | Void Shape | Indefinite Shape along Particle Boundary | Indefinite Shape along Particle Boundary |
|  | Microscopic Structure in Particles | Crystal Grains with approximately 20 μm, No amorphous layer | Crystal Grains with approximately 20 μm, No amorphous layer |
|  | Area Ratio of crystal Grains with Grain Size of 1 μm or Less in Corrosion-Resistant Metal Particles | 0% | 0% |
| Corrosion Resistance | Natural Potential of Coating |  |  |
|  | Relative Difference in Natural Potential Between Coating and Base Material |  |  |
|  | Mass Reduction Rate | 5% | 10% |
|  | Main Corrosion State | Corrosion of Co Alloy Part Intergranular Corrosion of Fe Matrix Crevice Corrosion of Void Part | Intergranular Corrosion of Fe Alloy Part Crevice Corrosion of Void Part |
| Wear Resistance | Wear Amount | 20 μm | 44 μm |
|  | Manufacturing Method | Sintering and Cu Infiltration | Sintering |

|  |  | Comparative Example 3 | Comparative Example 4 |
|---|---|---|---|
| Corrosion-Resistant Metal Material | Material | Cu Alloy | — |
|  | Hardness | 93 Hv0.025 | — |
|  | Area Ratio | 10% | — |
| Hard Metal Material | Material | Co Alloy (Tribaloy T-400) | Co Alloy (Tribaloy T-400) |
|  | Hardness | 1028 Hv0.1 | 1034 Hv0.1 |
|  | Area Ratio | 27% | 36% |
| Hard Metal Material | Material | Fe and Fe Alloy (Fe Powder + Graphite Dispersed) | Fe and Fe Alloy (Fe Powder + Graphite Dispersed) |
|  | Hardness | 305 Hv0.1 | 325 Hv0.1 |
|  | Area Ratio | 53% | 55% |

TABLE 2-continued

| Coating Structure | Coating Structure | Corrosion-resistant metal particles were mutually separated, and corrosion resistant-metal particles and hard metal particles were dispersed to islands | Corrosion-resistant metal particles were mutually separated, and corrosion resistant-metal particles and hard metal particles were dispersed to islands |
|---|---|---|---|
| | Void Content | 10% | 9% |
| | Void Shape | Indefinite Shape along Particle Boundary | Indefinite Shape along Particle Boundary |
| | Microscopic Structure in Particles | Crystal Grains with approximately 20 μm, No amorphous layer | Crystal Grains with approximately 20 μm, No amorphous layer |
| | Area Ratio of crystal Grains with Grain Size of 1 μm or Less in Corrosion-Resistant Metal Particles | 0% | 0% |
| Corrosion Resistance | Natural Potential of Coating | | −603 mV |
| | Relative Difference in Natural Potential Between Coating and Base Material | | 130 mV |
| | Mass Reduction Rate | 4% | 4% |
| | Main Corrosion State | Corrosion of Co Alloy Part Intergranular Corrosion of Fe Matrix Crevice Corrosion of Void Part | Corrosion of Co Alloy Part Intergranular Corrosion of Fe Matrix Crevice Corrosion of Void Part |
| Wear Resistance | Wear Amount | 21 μm | 23 μm |
| | Manufacturing Method | Sintering | Sintering |

| | | Comparative Example 5 |
|---|---|---|
| Corrosion-Resistant Metal Material | Material | — |
| | Hardness | — |
| | Area Ratio | — |
| Hard Metal Material | Material | Co Alloy (Tribaloy T-400) |
| | Hardness | 1104 Hv0.1 |
| | Area Ratio | 22% |
| Hard Metal Material | Material | Fe and Fe Alloy (Fe Powder + Graphite Dispersed) |
| | Hardness | 346 Hv0.1 |
| | Area Ratio | 68% |
| Coating Structure | Coating Structure | Corrosion-resistant metal particles were mutually separated, and corrosion resistant-metal particles and hard metal particles were dispersed to islands |
| | Void Content | 10% |
| | Void Shape | Indefinite Shape along Particle Boundary |
| | Microscopic Structure in Particles | Crystal Grains with approximately 20 μm, No amorphous layer |
| | Area Ratio of crystal Grains with Grain Size of 1 μm or Less in Corrosion-Resistant Metal Particles | 0% |
| Corrosion Resistance | Natural Potential of Coating | −672 mV |
| | Relative Difference in Natural Potential Between Coating and Base Material | 61 mV |
| | Mass Reduction Rate | 5% |
| | Main Corrosion State | Corrosion of Co Alloy Part Intergranular Corrosion of Fe Matrix Crevice Corrosion of Void Part |
| Wear Resistance | Wear Amount | 25 μm |
| | Manufacturing Method | Sintering |

The results in Tables 1 and 2 show that the sliding members of Examples, in which the hard metal particles were dispersed in an island manner in a particle aggregate of the corrosion-resistant metal particles and the area ratio of the corrosion-resistant metal particles was 30% or larger, were superior to the sliding members of Comparative Examples in corrosion resistance and in wear resistance with time. Moreover, the sliding members of Examples 2 to 4 having amorphous substance at interfaces between the particles, were superior to the sliding members of Examples 5 to 8 in corrosion resistance. Thus, it was confirmed that having the amorphous substance at interfaces between the particles prevents corrosion even when condensed water permeates the coating.

Furthermore, as for the sliding members of Examples 2 to 4, it is shown that the corrosion-resistant metal particles were plastically deformed to make crystals in the particles fine in forming the coating, whereby a coating having high hardness was formed.

REFERENCE SIGNS LIST

1 Sliding member
2 Coating
21 Corrosion-resistant metal particles
22 Hard metal particles
23 Amorphous substance
3 Base material

The invention claimed is:
1. A sliding member comprising:
a base material; and
a coating on the base material; wherein:
the coating contains hard metal particles, and corrosion-resistant metal particles that have hardness lower than hardness of the hard metal particles,
the hard metal particles have a Vickers hardness of 600 Hv or higher, and the corrosion-resistant metal particles have a Vickers hardness lower than 600 Hv, wherein the Vickers hardness is measured and calculated in accordance with Vickers hardness test JIS Z 2244,
the corrosion-resistant metal particles are made of at least one kind of metal selected from a the group consisting of copper (Cu), cobalt (Co), chromium (Cr), and nickel (Ni), or are made of an alloy containing said at least one kind of metal,
the corrosion-resistant metal particles form a particle aggregate in which interfaces are formed between the corrosion-resistant metal particles without forming a uniform structure, wherein surfaces of the corrosion-resistant metal particles are locally melted and solidified, and are bonded to each other, wherein the particle aggregate is not an aggregate in which the corrosion-resistant metal particles are completely melted or dissolved and solidified to form a uniform structure, the coating has a cross section in which the hard metal particles are dispersed so as to be spaced from each other in the particle aggregate of the corrosion-resistant metal particles, and in which an area ratio of the corrosion-resistant metal particles is 30% or larger, the coating comprises a sintered body that is press-fit in the base material, and the sintered body is a body that has been formed by sintering a compression-molded or metal powder-injected green body of mixed metal particles of the corrosion-resistant metal particles and the hard metal particles, and baking the green body at a temperature lower than a melting temperature of the mixed metal particles.

2. The sliding member according to claim 1, wherein the hard metal particles are made of at least one kind of metal selected from a group consisting of cobalt (Co), chromium (Cr), and nickel (Ni), or are made of an alloy containing said at least one kind of metal, and the Vickers hardness of the hard metal particles is 700 Hv or higher.

3. The sliding member according to claim 1, wherein the area ratio of the corrosion-resistant metal particles is 50% or larger.

4. The sliding member according to claim 3, wherein the area ratio of the corrosion-resistant metal particles is 80% or larger.

5. The sliding member according to claim 1, wherein an area ratio of the hard metal particles is 5% or larger and 50% or smaller.

6. The sliding member according to claim 1, wherein a void content is 10 area % or smaller.

7. The sliding member according to claim 1, wherein a void content is 5 area % or smaller.

8. The sliding member according to claim 1, wherein the coating includes an independent void by which condensed water is prevented from entering the independent void and an oxygen concentration cell is prevented from forming in the coating, whereby occurrence of crevice corrosion in the coating is suppressed.

9. The sliding member according to claim 1, wherein the coating has a natural potential of −600 mV or higher.

10. The sliding member according to claim 9, wherein the coating has a natural potential of 0 mV or higher.

11. The sliding member according to claim 1, wherein a relative difference in natural potential between the coating and the base material is 1100 mV or smaller.

12. The sliding member according to claim 1, wherein the base material is made of an aluminum alloy.

* * * * *